United States Patent Office 3,347,969
Patented Oct. 17, 1967

3,347,969
A METHOD OF MAKING CRIMPED POLY-
OXYMETHYLENE FILAMENTS
Gregory M. Moelter, Basking Ridge, N.J., assignor to
Celanese Corporation, a corporation of Delaware
No Drawing. Filed Aug. 1, 1962, Ser. No. 213,882
2 Claims. (Cl. 264—210)

This invention relates to a novel fiber product.

The production of filamentary material from oxymethylene polymers is disclosed in applications Serial No. 44,544, filed July 22, 1960 by Hudgin et al. and Serial No. 44,543, filed on the same date by Williams both of which are assigned to the same assignee as the instant case and are incorporated herein by reference.

It is an object of this invention to provide a novel product comprising fibers of oxymethylene polymers. It is a further object of this invention to provide a novel product comprising fibers of an oxymethylene polymer, which product has various properties desirable in certain applications, e.g. high bulkiness and/or a novel texture and appearance. Other objects will be apparent from the following detailed description and claims.

In accordance with one aspect of the invention, fibers of an oxymethylene polymer are made into a composite product together with other fibers, e.g. fibers which do not shrink to the same degree on carrying out a shrinking treatment as do the fibers of oxymethylene polymer. The composite product is then subjected to a shrinking treatment. The shrinkage differential between the oxymethylene polymer fibers and the other fibers upon carrying out the shrinking treatment causes the composite product to become bulky and/or take on a novel texture and appearance.

As disclosed for example in the aforementioned applications Serial Nos. 44,544 and 44,543, the fibers of an oxymethylene polymer utilized in this invention may be formed by extruding through a spinning orifice a liquid phase stream comprising the oxymethylene polymer and solidifying the stream into a filament.

Oxymethylene polymers, having successively recurring —CH$_2$O— units have been known for many years. They may be prepared by the polymerization of anhydrous formaldehyde or by the polymerization of trioxane which is a cyclic trimer of formaldehyde.

High molecular weight oxymethylene polymers may be prepared in high yields and at rapid reaction rates by the use of acidic boron fluoride-containing catalysts such as boron fluoride itself, and boron fluoride coordinate complexes with organic compounds in which oxygen or sulfur is the donor atom, as described in U.S. Patents 2,989,506 and 2,989,507 of Hudgin and Berardinelli, the disclosures of which are incorporated herein by reference.

Oxymethylene polymers of improved thermal stability have been prepared by copolymerizing trioxane with from 0.5 to 25. mol percent of a cyclic ether having adjacent carbon atoms. Copolymers of this type are described in U.S. Patent No. 3,027,352 issued March 27, 1962 to Walling et al., the disclosure of which is incorporated herein by reference. The preferred copolymers are those made up of oxymethylene and oxyethylene groups, such as copolymers of trioxane with dioxolane or with ethylene oxide.

Other methods of preparing oxymethylene polymers are disclosed by Kern et al. in Angewandte Chemie 73 (6) 177–186 (March 21, 1961), including polymers containing repeating carbon-to-carbon single bonds in the polymer chain by copolymerizing trioxane with cyclic ethers such as dioxane, lactones such as beta-propiolactone, anhydrides such as cyclic adipic anhydride and ethylenically unsaturated compounds such as styrene, vinyl acetate, vinyl methyl ketone, acrolein, etc.

Also known in the art, e.g. as described in the Kern et al. article cited above, are oxymethylene polymers the end groups of which are reacted or "capped" with a carboxylic acid, e.g. an alkanoic acid such as acetic acid to form ester end groups or with a monomeric ether, e.g. a dialkyl ether such as dimethyl ether to form ether end groups.

Among the oxymethylene polymers which may be used in this invention are oxymethylene homopolymers, with stabilizing end groups if desired, and oxymethylene copolymers e.g., containing carbon-to-carbon bonds in the main polymer chain, particularly copolymers having a recurring structure comprising recurring units having the formula

wherein $n$ is an integer from zero to 5 and wherein $n$ is zero in from 75 to 99.5 percent of the recurring units.

A preferred class of copolymers are those having a structure comprising recurring units having the formula (—O—CH$_2$—(CH$_2$)$_n$—) wherein $n$ is an integer from zero to 2 and wherein $n$ is zero in from 75 to 99.5 percent of the recurring units. These copolymers are prepared by copolymerizing trioxane with a cyclic ether having the structure

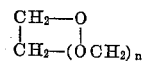

where $n$ is an integer from zero to two.

Among the specific cyclic ethers which may be used are ethylene oxide, 1,3-dioxolane, 1,3,5-trioxepane, k,3-dioxane, trimethylene oxide, pentamethylene oxide, 1,2-propylene oxide, 1,2-butylene oxide, neopentyl formal, pentaerythritol diformal, paraldehyde, tetrahydrofuran, and butadiene monoxide.

It is generally desirable to incorporate one or more thermal stabilizers into the oxymethylene polymer before spinning in order to enhance its thermal stability.

The proportion of stabilizer incorporated into the oxymethylene polymer depends upon the specific stabilizer used. A proportion between about 0.05 and 10 weight percent (based on the weight of polymer) has been found to be suitable for most stabilizers.

One suitable stabilizer system is a combination of an anti-oxidant ingredient such as a phenolic anti-oxidant and most suitably a substituted bisphenol, and an ingredient to inhibit chain scission, generally a compound or a polymer containing trivalent nitrogen atoms.

A suitable class of alkylene bisphenols includes compounds having from 1 to 4 carbon atoms in the alkylene group and having from zero to 2 alkyl substituents on each benzene ring, each alkyl substituent having from 1 to 4 carbon atoms. The preferred alkylene bisphenols are 2,2'-methylene bis-(5-methyl-6-tertiary butyl phenol) and 4,4'-butylidene bis-(6-tertiary butyl-3-methyl phenol). Suitable phenolic stabilizers other than alkylene bisphenols include 2,6-ditertiary butyl-4-methyl phenol, octyl phenol and p-phenyl phenol.

Suitable scission inhibitors include carboxylic polyamides, polyurethanes, substituted polyacrylamides, polyvinyl pyrrolidone, hydrazines, compounds having 1 to 6 amide groups, proteins, compounds having tertiary amine and terminal amide groups, compounds having amidine groups, cycloaliphatic amine compounds and aliphatic acylureas. Suitable scission inhibitors as well as suitable antioxidants and proportions are disclosed in application Serial No. 826,115 filed by Dolce on July 10, 1959, application Serial No. 831,720, filed by Dolce, Berardinelli and Hudgin on August 5, 1959, application Serial No. 838,427, filed by Berardinelli on September 8, 1959, application Serial No. 838,832, filed by Dolce and Hudgin on September 9, 1959, application Serial No. 841,690, filed by Kray and Dolce on September 23, 1959, application Serial No. 851,560, filed by Berardinelli, Kray and Dolce on November 9, 1959, application Serial No. 1,457, filed by Dolce and Berardinelli on January 11, 1960 and application Serial No. 4,881, filed by Kray and Dolce on January 27, 1960. The disclosures of the above-mentioned applications are incorporated herein by reference.

The stabilizers may be incorporated into the oxymethylene polymer by dissolving both the polymer and the stabilizer in a common solvent and thereafter evaporating the solution to dryness. Alternatively, the stabilizers may be incorporated into the polymer by applying a solution of the stabilizer to finely divided polymer, as in a slurry, and thereafter filtering the polymer and evaporating to dryness. The stabilizer, in finely divided dry state may be blended into finely divided polymer in any suitable blending apparatus.

One suitable method of incorporation of the chemical stabilizers is by blending a dry solid stabilizer into the plastic polymer, while the latter is being kneaded as on heated rolls or through an extruder.

Since the stabilizers are generally normally solid materials, it is important that they be very finely divided in the final blend for melt spinning. Larger particles of stabilizer may clog the orifices of the spinning jet or may constitute a substantial portion of the cross section at a particular portion of the fiber. The maximum particle size of stabilizer which may be tolerated depends upon the size of the spinning orifices and the denier of the final filament, but in general the stabilizer particles should be smaller than 5 microns in diameter.

The spinning operation is carried out in a unit which melts or dissolves the solid polymer and pumps it at a constant rate and under fairly high pressure through the small holes in a spinnerette.

Melt spinning temperatures may range from about 190° C. to 220° C. for the oxymethylene polymers. Lower temperatures are used in conjunction with the addition of from 1 to 50 weight percent of a viscosity reducing material as disclosed in application Serial No. 44,543.

The oxymethylene polymer is generally melted by subjecting chips of the polymer to the action of a heated screw extruder. The chips are suitably between about 200 and 2 mesh. The melt is forced through the spinnerette orifices by a metering pump. Generally, a filter or sand pack is maintained upstream of the orifices to remove particles or gels which might block them. Preferably, the polymer is maintained as a melt for not more than 600 seconds.

The spinnerette may contain from one to about 500 orifices. For most textile purposes, the orifices may be between about 5 and 25 mils in diameter. Monofilaments, for special uses such as tow rope, may be extruded through orifices up to 100 mils in diameter. The liquid streams emerge from the orifices, generally downwardly, into a gaseous medium, which may be air or an inert gas and solidify. The filaments are taken up at a velocity between about 1 and 3600 meters/min.

Solution spinning temperatures may range from about 125 to 210° C. The polymer concentration in the solution may range from about 5 to about 25 weight percent. Suitable solvents for solution spinning include dimethyl formamide, benzyl alcohol, anisole and butyrolactone.

The oxymethylene polymer streams, in solution spinning, may be spun into air or an inert gas, as in melt spinning. Solidification takes place by evaporation of the solvent and by the cooling of the solution. The polymer streams may also be spun into a non-solvent liquid where solidification takes place by the reduced solvent power of the system. Suitable non-solvents include water, hydrocarbons and alcohols.

In order to improve the physical properties of the oxymethylene polymer filaments they are drawn after extrusion to orient the polymer molecules. Oxymethylene polymer filaments are preferably drawn to about 3 to 20 times their original length at a temperature between about 60° and 155° C. The drawn filaments may then be wound up on bobbins to any desired length.

Oxymethylene polymer fibers contemplated under this invention may have for example a tenacity in the range of 4 to 13.5 grams per denier, an elongation in the range of 9 to 60 percent and a modulus in the range of 25 to 200 grams per denier.

It has been found that many fibers of oxymethylene polymers, e.g. produced as described above, exhibit a substantial degree of shrinkage when subjected to a heat treatment in the relaxed state. Thus, one method of obtaining the product of this invention is to form a composite product of such oxymethylene polymer fibers with other fibers which do not shrink or shrink to a substantially lower degree when heat treated, and then to heat treat the composite product. The resulting differential shrinkage causes the product to become bulky and assume a novel appearance and texture.

The fibers which are used in conjunction with the fibers of oxymethylene polymers to produce the composite products of this invention are preferably those which do not shrink or shrink to a degree substantially less than the fibers of oxymethylene polymer on being subjected to a heat treatment in the relaxed state at a temperature below the melting point of the oxymethylene polymer. Such fibers include, for example, natural fibers such as cotton, linen, wool, silks and other vegetable and animal fibers, and man-made fibers such as those of fiber forming polyamides, e.g., polyhexamethylene adipamide, polycaprolactam and polyhexamethylene sebacamide, fiber-forming linear polyesters such as polyethylene terephthalate, rayon, including saponified fibers of cellulose acetate, cellulose esters such as cellulose secondary acetate and cellulose triacetate, and acrylic polymers such as acrylonitrile polymers. The fibers which are preferred for use with oxymethylene polymer fibers are the natural fibers, polyamide fibers, polyester fibers and rayon. Preferably, the less heat shrinkable fiber does not have a softening point lower than that of the oxymethylene polymer fiber, e.g., 170° C.

The fibers of oxymethylene polymer contemplated to be used in conjunction with the foregoing other fibers are preferably those which as described above, exhibit a substantial degree of shrinkage when subjected to a heat treatment in the relaxed state, e.g. which are capable of shrinking at least 10% of their length when heated in the relaxed state at elevated temperature, e.g., from 120° C. to the melting point of the fiber. Preferably the oxymethylene polymer fibers are shrinkable in the relaxed state within a range of 10 to 35% of their total length when subjected to a temperature of 140 to 170° C. for 0.1 to 10 minutes.

Intended to be included within this invention are composite products made from heat-shrinkable oxymethylene polymer fibers of the latter type together with oxymethylene polymer fibers which have been treated to render them substantially less shrinkable on heat treatment, e.g., by heating them to a temperature of 150 to 170° C. for a period of 0.1 to 10 minutes while they are being held at constant length.

Composite products contemplated under this invention are, for example, yarns made from blends of staple lengths of oxymethylene polymer fibers and other fibers, and blends of continuous filaments of oxymethylene polymer and the other type of fibrous material. Alternatively, the warp of a woven fabric may be composed of one type of fiber and the filler of the other type. These composite products may contain, for example, 5 to 95% by weight of the total yarn of oxymethylene polymer fiber. However, highly bulked products may be obtained by subjecting to a heat treatment a composite product containing a minor amount of oxymethylene polymer fiber, e.g., 5 to 45% by weight of such fiber.

After the composite product is formed, it may be formed into a bulky product and/or a product having a novel texture and appearance by treating it to cause substantial shrinkage, e.g., by heating the product to a temperature above 120° C. to the melting point of the fiber, preferably in the range of 140 to 170° C. for a period of 0.1 to 10 minutes. The heat treatment may be carried out, for example by contacting the material with a hot gas such as air or steam.

The differential shrinkage, i.e., the amount that one type of fiber shrinks more than the other type of fiber based on the initial lengths of the fibers is suitably at least 5% after the shrinking treatment, e.g., after heating the composite product to 150° C. for 30 seconds.

The shrunk composite products of this invention are useful, for example, in the production of textile articles such as articles of clothing and carpeting and in felted products. In particular, the composite products of this invention may be used in the manufacture of seersuckers, plisse, seat covers and pile fabrics.

The following examples further illustrate the invention.

*Example I*

A copolymer of trioxane and 2 wt. percent based on the polymerizable mixture of ethylene oxide was prepared as described in U.S. Patent No. 3,027,352 and aftertreated to remove unstable groups as described in application Ser. No. 102,096, filed Apr. 11, 1961. The copolymer was then further stabilized by blending with 0.5 wt percent of 2,2'-methylene bis (4-methyl 6-tertiary butyl phenol) and 0.1 wt. percent of cyanoguanidine based on the weight of the polymer.

The copolymer was melt spun at 190° C. on a screw-pump extruder through a 15 mil hole to form a 150 denier filament which was collected on a bobbin at 260 meters/minute. The filament was drawn over a hot metallic surface at a temperature of 140° C. using a draw ratio of 7.6 to 1 and a take-up speed of 150 meters/minute. The resulting filament had a denier of 20, a tenacity of 8.4 grams/denier, an elongation of 18.1% and a modulus of 63 grams/denier. On heating this filament in air for 10 minutes at 150° C. in a relaxed state, it shrunk 30%.

A portion of the filamentary material described above was annealed by holding it at constant length for 10 minutes at 160° C. After annealing, the material shrinks less than 10% when held in the relaxed state at 160° C. for 10 minutes.

A composite, continuous filament twisted yarn was prepared by combining one end of the unannealed and one end of the annealed filament before shrinking on a downtwister. This composite yarn bulked highly due to differential shrinkage of the two components when heated in air in a relaxed state to a temperature of 160° C.

*Example II*

The stabilized polymer of Example I was melt spun at 190° C. on a screw-pump extruder through a 34 hole spinnerette having hole diameters of 10 mils to form a 34 filament yarn having a denier of 600 which was taken up at a speed of 104 meters/minute. The yarn was drawn on a draw twister at a draw ratio of 6.55 to 1 and a take-up speed of 100 meters/minute, the yarn making two wraps around a 1½-inch pin at a temperature of 125° C. The yarn had a denier of 100, a tenacity of 7.6 grams/denier and an elongation of 23%. It shrunk 20% when held 5 minutes at 150° C.

The above yarn was mechanically crimped, cut into staple and combined with wool to form a composite staple yarn containing 15 wt. percent oxymethylene polymer fiber and 85 wt. percent wool, using procedures well known in the art. A piece of fabric woven from this yarn when heated in air at 150° C. for 30 seconds developed a high degree of loft.

In each of the above examples, the differential shrinkage was over 5%.

In addition to a heat treatment at a temperature, for example, above 120° C., e.g., 160° C., such as that described in the above examples, other methods may be used to obtain the differential shrinkage of the invention. Thus, if the fibers blended with oxymethylene polymer fibers tend to shrink on being contacted with hot water, the differential shrinkage may be accomplished by a hot water treatment. In this case, however, the other fibers, e.g., wool will shrink more than the oxymethylene polymer fibers which do not tend to shrink a great deal on being boiled in water.

Another method of accomplishing differential shrinkage is by contact of the composite product with a swelling solvent for the oxymethylene polymer, e.g., dimethyl formamide, and subsequent removal of the solvent. This will cause the oxymethylene polymer fibers to shrink more than many other fibers which it may be blended with, e.g., cellulosic fibers such as cotton.

It is to be understood that the foregoing detailed description is given merely by way of illustration and that many variations may be made therein without departing from the spirit of my invention.

Having described my invention what I desire to secure by Letters Patent is:

1. A process comprising melt spinning a copolymer of trioxane with from 0.5 to 25 mol percent of a cyclic ether having adjacent carbon atoms at a temperature of from about 190° C. to 220° C. to form filaments, drawing said filaments to about 3 to 20 times their original length at a temperature between about 60 and 155° C. to obtain filaments which are shrinkable in the relaxed state within a range of from 10 to 35% of their total length was subjected to a temperature of from 140 to 170° C. for 0.1 to 10 minutes, annealing a portion of said drawn filaments by heating them at constant length to a temperature in the range of 150 to 170° C. for 0.1 to 10 minutes and blending the annealed and unannealed filaments into a composite product.

2. The process of claim 1 wherein said composite product is heated in the relaxed state to a temperature of 140 to 170° C. for 0.1 to 10 minutes to obtain a textured product.

References Cited

UNITED STATES PATENTS

| | | |
|---|---|---|
| 2,768,994 | 10/1956 | MacDonald. |
| 2,789,340 | 4/1957 | Cresswell _____ 28—72 |
| 2,985,940 | 5/1961 | Weidon _____ 28—72 |
| 2,988,782 | 6/1961 | Parrish et al. _____ 28—82 X |

ALEXANDER WYMAN, *Primary Examiner.*

D. W. PARKER, JACOB H. STEINBERG, *Examiners.*

A. J. SMEDEROVAC, R. A. FLORES,
*Assistant Examiners.*